Figures 1, 2, 3, 4:
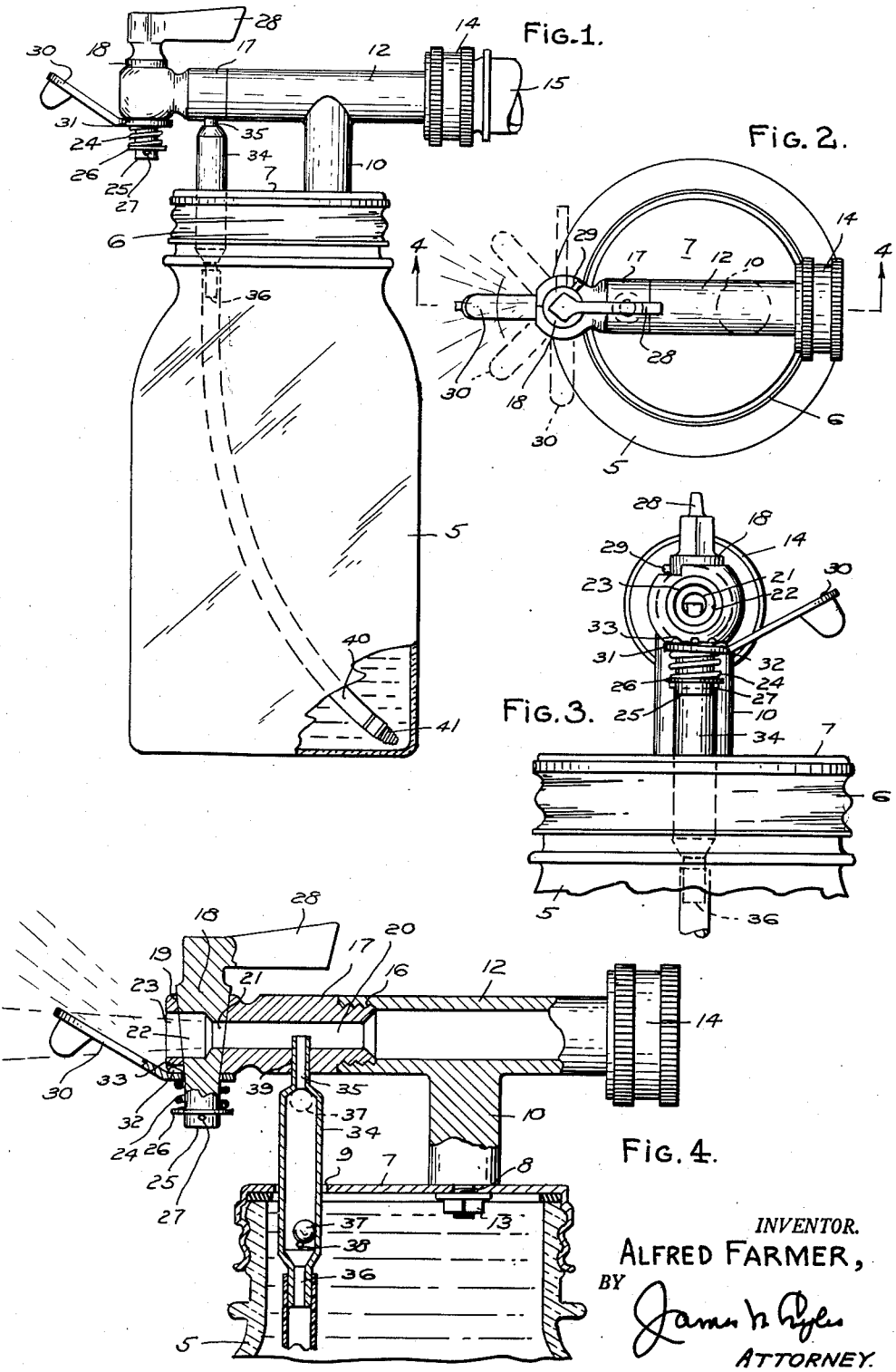

Sept. 4, 1956 — A. FARMER — 2,761,734
SPRAY DEVICE
Filed June 3, 1955

INVENTOR.
ALFRED FARMER,
BY
ATTORNEY.

United States Patent Office 2,761,734
Patented Sept. 4, 1956

2,761,734

SPRAY DEVICE

Alfred Farmer, Miami, Fla.

Application June 3, 1955, Serial No. 512,941

5 Claims. (Cl. 299—84)

This invention relates to improvements in spray devices and particularly to a spray device that is coupled with a fluid line, such as a garden hose and with the spray device being detachably engaged with a receptacle whereby to dilute and spray insecticides, plant foods or the like that are soluble in water.

The invention contemplates a spray device embodying a tubular barrel having a cut-off cock at one end and a hose coupling means at the other end and a tubular siphon device that communicates with the barrel at one end and with its other end depending into the receptacle whereby a flow of water through the barrel will siphon a predetermined quantity of plant food or the like to be mixed with the water and sprayed from the discharge end of the barrel.

A further object of the invention resides in a novel siphon tube having a check valve in its length whereby to stop a siphon action to the receptacle contents and whereby the spray device functions only to spray water from its discharge end.

A further and important object of the invention resides in a spray device having the above mentioned characteristics, wherein the stop cock functions to stop the discharge of water from the discharge end and to direct such water into the receptacle for mixing and diluting the plant food, etc.

A further object of the invention resides in a deflector tongue that is connected to the spray device to be shiftable into and out of the line of a stream of fluid from the barrel and whereby to create a fan-like spray for a wide coverage or, when shifted out of the line of the stream to permit of a straight flow of the fluid to enable the application of plant foods, insecticides or the like at relatively great distances, such as high trees.

Novel features of construction and operation of the device will be readily apparent during the course of the following description, reference being had to the accompanying drawings, wherein has been illustrated a preferred form of the device and wherein like characters of reference are employed to denote like parts throughout the several figures.

In the drawings:

Figure 1 is a side elevation of a device constructed in accordance with the invention, Figure 2 is a plan view thereof, Figure 3 is a front view thereof and, Figure 4 is a central longitudinal section, taken substantially on line 4—4 of Figure 2.

Referring specifically to the drawings, the numeral 5 designates a receptacle, here illustrated as a conventional glass fruit jar, having an upper threaded end for the reception of a screw cap. The jar may be either a one quart or two quart size as may be found desirable.

Threaded upon the end of the jar 5, is a metallic screw cap 6, preferably formed of brass or other material capable of withstanding the corrosive action of certain chemicals employed in insecticides or plant foods. The flat top 7 of the cap 6, is apertured at 8 and 9, for a purpose to be presently described.

Rigidly supported upon the cap 6, as by a preferably integral lug 10, is a tubular barrel 12, preferably disposed horizontal and parallel to the flat top 7. The lug 10 is provided with a reduced threaded extension that engages through the aperture 8, for the reception of a clamping nut 13.

The barrel 12 is provided at one end with a rotatable hose coupling 14 of conventional construction, for detachable connection with the usual garden hose 15 whereby to supply water under pressure to the barrel. The forward end of the barrel is open and provided with internal threads 16, for threaded engagement with the threaded end of a cylindrical sleeve 17, provided at its outer end with a preferably tapered cut-off cock plug 18, rotatable in a tapered bore 19 of the sleeve. The sleeve 17 is axially bored at a reduced diameter, as at 20 and with the bore communicating with the barrel and the tapered bore 19. The plug 18 is transversely ported in two diameters, as at 21 and 22, with the diameter 21 being substantially of the same diameter as the bore 20, while the diameter 22 is of larger diameter and communicates with a discharge opening 23, formed in the end of the sleeve. The opening 23 and the diameter 22 are substantially identical, for a purpose to be presently described. The plug 18 is held to its seat within the bore 19, by a coil spring 24, engaging the lower end of the plug extension 25, through the medium of a washer 26 and a pin 27. A handle 28 is formed upon the upper end of the plug 18 and serves as the means whereby the operator may shift the plug to open and closed positions and whereby its position will indicate the open and closed position of the cock. A stop pin 29 determines the maximum shifting degree of the plug to both the open and closed positions.

Means are provided to create a wide and relatively fine spray of fluid from the device, comprising a baffle tongue 30, formed upon a plate 31 that is apertured to engage over the plug extension 25 and disposed between the spring 24 and the lower end of the plug valve head, whereby it is frictionally held against accidental movement in a horizontal path. The tongue 30 is angled upwardly whereby it is disposed in the line of a stream of pressurized fluid being discharged from the device and whereby the stream of fluid striking against the tongue will be spread in a fan shape to cover a relatively wide area. The tongue 30 is shiftable laterally out of the line of the spray stream, as indicated in dotted lines in Figure 2 and to additionally guard against accidental shifting of the tongue and to indicate to the operator the active or inactive position of the tongue, the tongue has been provided at its point of connection with the plate 31, with a lug 32, that is selectively engaged within spaced notches 33, cut into the lower end of the cock housing. The baffle tongue 30, while having definite active and inactive positions, may readily be disposed in a partial active or inactive position whereby to obtain both a side spray and a relatively long spray, such use being desirable in spraying trees where it is necessary to thoroughly spray the under parts of the leaves at varying heights.

The mixing and siphoning means whereby the jar contents may be diluted and then siphoned under the influence of the flow of pressurized water through the barrel 12, comprises a cylindrical and preferably metallic elongated valve chamber 34, having reduced nipples 35 and 36 at its opposite ends. Disposed within the chamber 34, is a ball valve 37, held against closing with respect to the lower nipple 36, by a cross pin 38. The ball is free to engage the upper reduced end of the chamber for closing the nipple 35, when the spray device and its associated jar are inverted, for a purpose to be presently described. The nipple 35 has a force fit engagement through an aperture 39, formed through the sleeve 17 and with the aperture 39 and the aperture 9 of the cap being concentric and in alignment. The valve chamber 34 extends downward through the aperture 9 and partially into the jar below the flat top 7 and with the chamber being in spaced relation to the edges of the aperture 9 as a means to permit the entry of air into the jar in order to prevent a vacuum therein. Connected with the nipple 36, is a preferably plastic feed tube 40, having its lower end terminating at the bottom of the jar. The tube 40 at its lower or terminal end is provided with a suitable strainer device 41 whereby to prevent the clogging of the tube and the siphoning nipple 35. The nipple 35 bisects the bore 20 and is in communication with the bore 20 and the valve chamber 34 whereby the contents of the jar may be siphoned upwardly to mix with the pressurized stream of water from the barrel 12, for discharge from the aperture 23. The purpose in forming the openings 22 and 23 of a larger diameter than the bore 20, is to permit a straight away stream of fluid from the bore 20 without having frictional and retarding engagement with the apertures 22 and 23.

The use of the device is as follows:

The operator first removes the cap 6 with its associated spray mechanism from the jar 5, at which time he places the desired materials to be sprayed within the jar. These materials may be liquid or crystal and are usually highly concentrated and require diluting even before the additional dilution by the spray stream. If in crystallized form, or water soluble fertilizers, they must first be reduced to a liquid. In order to avoid first filling the jar with water and that would be relatively awkward to then rescrew the cap in position, the concentrate is placed in the jar and the cap and the associated spray mechanism reengaged therewith. With the hose 15 connected and the water turned on, the operator closes the valve 18, forcing the water from the barrel 12 down through the nipple 35, valve chamber 34, nipple 36, tube 40 to fill the jar to the desired level. Obviously, the jar is agitated for a thorough mixing of the ingredients. After the jar has been filled, the valve cock 18 is again shifted to the open position, which action directs the flow of water through the bore 20, across the end of the nipple 35, picking up by a siphon action a relatively minute quantity of the jar contents for discharge with the water through the aperture 23. The rate of siphon pick-up has been calculated in accordance with recognized dilution of various insecticides or fertilizers. For spraying high trees or the like, the operator shifts the baffle tongue to one side, permitting a relatively narrow stream of material to be projected a very considerable distance, capable of reaching most fruit and ornamental trees. For spraying shrubs, small trees and flowers, the tongue is again shifted forwardly where it lies in the path of the stream and the stream is then deflected in a wide fan-like spray that is relatively fine, covering a wide area to either side and in front. When transporting the spray device from tree to tree or the like and to prevent a waste of the jar contents, the operator merely inverts the jar, causing the ball 37 to drop into engagement with the opening into the nipple 35, and, due to the suction created upon the nipple 35 by the flow of water therepast, the ball will be held to a closure seat, permitting only a flow of water from the device. When the jar contents are again needed, the operator momentarily closes the cock 18, forcing the ball 37 from its seat, where it falls into engagement with the pin 38 and remains in such position until otherwise again shifted. Thus, the operator may move from place to place without cutting off the water and yet not waste the jar contents.

It will be apparent from the foregoing, that a very novel and highly effective spray mechanism has been provided. The parts are few and simple, cheap to manufacture and offers a spray device capable of spraying relatively wide areas and relatively high areas, such as trees. The novel form of check valve as disposed within the siphon line is especially advantageous in checking the flow of the jar contents when moving from place to place. The barrel arrangement provides a very convenient hand grip whereby to easily direct the spray in the desired direction, thus avoiding the necessity of forming an additional handle. It will of course be understood, that the several parts are constructed of material having a high resistance to the corrosive actions of the chemicals employed.

It is to be understood, that while a preferred form of the invention has been illustrated and described, changes are contemplated as readily fall within the spirit of the invention, as shall be determined by the scope of the subjoined claims.

Having described my invention, what I claim as new and desire to secure by Letters Patent is:

1. A device for spraying plant foods, fertilizers and insecticides that includes a receptacle wherein the material to be sprayed is mixed with water, the receptacle having a threaded open upper end, a closure cap threadedly engaged with the receptacle, a spray device comprising a tubular barrel open at its opposite ends and provided at one end with a hose coupling whereby to receive water under pressure to the barrel, the barrel being rigidly connected to the cap in overlying parallel relation, an extension sleeve connected with the opposite end of the barrel and with the sleeve being axially bored coaxial to the tubular barrel, a stop cock carried at the free end of the sleeve and with the stop cock communicating with the bore of the sleeve and an enlarged discharge spray opening, a siphon device that communicates with the bore of the sleeve at one end and with its opposite end extending into the receptacle, a check valve disposed in the siphon device whereby to check the siphoning action without interrupting the flow of water through the spray device, the said stop cock when in a closed position directing the flow of water through the siphon device for diluting the material in the receptacle and a deflector tongue rotatably disposed adjacent the stop cock whereby the tongue may be disposed in the line of fluid discharge to spread the discharge fluid in a fan shape, the said tongue being shiftable out of the line of fluid discharge to permit a relatively narrow long stream of spray fluid to be projected.

2. The device according to claim 1, wherein the stop cock comprises a tapered plug that is rotatable in a tapered valve chamber of the sleeve, the plug being transversely apertured in two diameters, with one diameter corresponding to the diameter of the bore of the sleeve and the other diameter corresponding to an enlarged discharge spray opening whereby fluid under pressure will be discharged from the bore of the sleeve in a steady uninterrupted stream, the plug having a lower extension that projects from the valve chamber, a spring device engaging the extension whereby to maintain the plug seated within the tapered chamber, the said deflector tongue having an apertured head that is disposed upon the plug extension between the spring and the lower end of the valve head, the tongue being upwardly inclined whereby it will extend into the line of flow of fluid from the discharge opening when in the operative position and to lie out of the line of flow of the fluid being discharged when shifted laterally, a lug formed on the apertured head of the tongue that progressively engages notches formed in the valve head to maintain and indicate to the operator the position of the tongue.

3. The device according to claim 1, wherein the opening of the barrel is relatively larger than the bore of the sleeve, the said siphon device having a siphon end that is force fitted through an aperture of the sleeve whereby the siphon end bisects the bore of the sleeve, the said siphon device extending through a relatively large opening of the cap to terminate at the bottom of the receptacle, the said opening of the cap being larger than the diameter of the siphon device and concentric thereto and whereby to provide an air opening for the receptacle to prevent the forming of a vacuum therein as the contents are siphoned out.

4. The device according to claim 1, wherein the siphon device comprises a tubular valve chamber terminating at its opposite ends in reduced tubular nipples and with the valve chamber and the nipples being open throughout, a ball valve disposed in the chamber and maintained against seating at the lower end of the chamber by a cross pin whereby to permit of an uninterrupted flow of fluid to and from the receptacle, the upper nipple being force fitted through a lateral opening formed in the sleeve whereby the nipple extends into the bore of the sleeve for substantially one-half the diameter of the bore and whereby the flow of water past the open end of the nipple will siphon the receptacle contents upward to be mixed with the water and discharged from the discharge opening, the said stop cock when shifted to the closed position serving to direct the flow of water downwardly through the siphon device to mix with the receptacle contents, the spray device when inverted causing the ball to shift to the upper end of the chamber for checking the flow of the receptacle contents, the said ball being maintained in such checking position when the spray device is again disposed in the upright position due to the suction created upon the upper nipple under the influence of the water flowing therepast, the said ball being unseated and returned to its normal position against the stop pin when the stop cock is momentarily closed, a flexible tube connected with the lower nipple and that extends downward into the receptacle to terminate at the bottom thereof, the terminal end of the tube being provided with a strainer.

5. A spray device whereby to spray plant foods, fertilizers and insecticides, that includes a receptacle that is open at its top and threaded, a metallic cap that is threadedly engaged with the receptacle, the spray device comprising a tubular head that is open at its opposite ends and with the tubular device being rigidly connected to the cap in a manner whereby the tubular device constitutes a handle, the tubular device at one end being provided with a hose coupling whereby to have a connection with a source of water under pressure, the tubular device at its opposite end being provided with a stop cock whereby to control the flow of water through the device for discharge, the cap being provided with a cylindrical opening, a siphon device including a valve chamber and a valve therein, the chamber being provided with extended nipples at its opposite ends, one of the nipples extending through an opening formed in the spray device to be disposed in the line of flow of the water through the device, the said valve chamber extending downwardly through the opening of the cap, a tube connected with the other nipple to terminate at its lower end at the bottom of the receptacle, a spray deflector supported upon the spray device at its discharge end and movable into and out of the line of flow of the water from the spray device, the said receptacle being filled with water by reversing the flow of water from the spray device downwardly through the siphon device to dilute plant foods, fertilizers or insecticides that are placed in the receptacle, the fluid contents of the receptacle being again reversed by a siphon action of the water passing through the spray device and a check valve ball included in the valve whereby to stop the flow of the receptacle contents when the spray device is momentarily inverted and when the device is shifted from place to place without interrupting the flow of water and means to unseat the ball when the flow of water is momentarily interrupted at the discharge end of the device.

References Cited in the file of this patent

UNITED STATES PATENTS

| | | |
|---|---|---|
| 2,188,366 | Lindstaedt | Jan. 30, 1940 |
| 2,295,661 | Hunter | Sept. 15, 1942 |
| 2,536,361 | Flanders | Jan. 2, 1951 |
| 2,612,403 | Burch | Sept. 30, 1952 |